United States Patent Office 3,745,021
Patented July 10, 1973

3,745,021
METHOD FOR PRODUCING AN EXPANDED MEAT FOOD PRODUCT AND PRODUCT PRODUCED THEREBY
Peter Q. Van Middlesworth, Climax, Mich., Marvin E. Buck, Peekskill, N.Y., and Bruce R. Seemann, Fond du Lac, Wis., assignors to General Foods Corporation, White Plains, N.Y.
No Drawing. Filed Sept. 17, 1970, Ser. No. 73,177
Int. Cl. A22c *18/00;* A22k *1/00*
U.S. Cl. 99—107                                   5 Claims

ABSTRACT OF THE DISCLOSURE

An expanded shelf-stable fresh meat food product possessing bacteriostasis is formed by subjecting meat, a farinaceous component, water and water-soluble solutes to elevated temperatures and pressure followed by extrusion to a zone of lower pressure.

BACKGROUND OF THE INVENTION

The invention of this disclosure relates to the food field in the area of so called intermediate moisture foods, which products have a substantial moisture content. This class of intermediate foods possesses the property which makes the product shelf stable and allows it to be stored without refrigeration. The composition is formulated so that it may be packaged under aerobic conditions in any suitable moisture impermeable container.

Prior art workers, namely Burgess et al. in U.S. Pat. Nos. 3,202,514 and 3,482,985 have provided the concept of cold packaging nutritionally balanced animal food of good acceptability when the product contains a 15 to 35% moisture. This advance in the art discloses the teaching that sugars, as a main constituent of the solute phase of a stabilizing solution, allow a matrix of nutritionally balanced meat and vegetable materials to be pasteurized and thereafter converted at low temperatures into a packaged form.

The invention of the present disclosure is also in the field of expanded food products wherein a composition is subjected to elevated temperature and pressure which causes a partial cooking of the food. The food is extruded through an orifice into a zone of reduced temperature and pressure, wherein the sudden pressure release causes an expansion of the food material. An example of a teaching of extrusion-expansion is Ludington et al., U.S. Pat. No. 3,119,691, issued Jan. 28, 1964. The patentees disclose preparing a particulate dry animal food with farinaceous and proteinaceous components employing extrusion from a zone of elevated temperature and pressure which causes expansion. The product is dried, cooled and coated with a fat.

SUMMARY OF THE INVENTION

The present invention discloses foods that are suitable for both human and animal use. These foods are shelf stable without the need for canning and yet contain a relatively high moisture content which would be within the range of 15% to 35%. Stability of the food containing substantial amounts of water is provided by the concept of limiting the amount of unbound water capable of supporting microbiological growth. Soluble solids in the food limit the amount of "free" water available to bacteria which prevents their growth under this condition. This so called intermediate moisture food is preserved against bacteriological and fungal growth by employing a combination of water soluble materials such as sugars, salts, sorbitol, propylene glycol and glycerine in combination with an antimycotic such as parabens, sorbic acid and its salts, benzoic acid, propionic acid and its salts. The shelf stability is initially incorporated into a system containing proteinaceous material derived from fresh meat with a farinaceous ingredient which aids in expansion and yields an appearance of fatty substance.

In order to produce the low density characteristics with a bubbly surface appearance on the food, it is necessary to first subject the source ingredients of fresh meat protein and a farinaceous substance to heat, causing at least partial gelatinization. The soluble components that impart microbiological stability are mixed with other initial ingredients prior to the extrusion-expansion operation. The proteinaceous material with the farinaceous ingredients at or after partial precooking, is subjected to an elevated pressure above about 100 p.s.i., and an elevated temperature above about 212° F. At elevated temperature and pressure mechanical working, as by a screw-type extruder subjects the mixture to frictional forces. The component is extruded through an orifice to a zone of lower pressure, preferably atmospheric, and a zone of lower temperature which causes a sudden expansion of the material. The expanded rope produced by the extrusion is cut to size and packaged in an impermeable container.

It is a purpose of this invention to produce a soft, moist food with a unique meaty texture and bubbly surface appearance combined with low density, such food having the property of shelf stability when packaged in a moisture impermeable container under aerobic conditions.

DETAILED DESCRIPTION OF THE INVENTION

The product produced by the present invention has a high degree of palatability combined with attractive appearance. The moist product may be readily packaged in any moisture impermeable wrapping container such as cellophane and in individual portions without the need of expensive canning operations. The requirements for hot packaging or thermal sterilization incident to packaging is eliminated. The processing steps combined with ingredients of the food gives a unique texture and appearance to the product combined with good chewiness. Since the packaging material may be transparent, the visual quality of the product is highly important for consumer preference in the marketplace. The food presents a bubbly surface appearance which presents a pleasing visual quality of a meat product. Since the product is expanded, it possesses a low density in comparison to non-expanded products. While the utility is a food generally, a specific adaptation is for animals, particularly dogs and cats.

The moist food employs the concept of limiting the amount of unbound water that is present. In turn, bacteria spoilage is minimized, since large quantities of free water are not present. Water is bound into the food system by use of soluble solids to raise the osmotic pressure to give the needed bacteriostatic effect. The total weight of water soluble solids generally is at least equal to the weight of water. However, it is possible to obtain the needed osmotic pressure increase when the total weight of water soluble materials is less than the weight of the water in the composition.

The preferred water soluble solid to give rise to the osmotic pressure increase is sugar. As employed herein "sugar" means any one in a series of useful water soluble saccharide materials which are capable of increasing the osmotic pressure of the water in which they are dissolved to give rise to desired level of bacteriostatic stability. Illustrative of useful sugars are the non-reducing polysaccharides and their degradation products; e.g. pentoses included aldopentoses, methylpentoses; ketopentoses like xylose and araginose; a deoxyaldose like rhamnose; hexoses and reducing saccharides such as aldohexoses like glucose, galactose and mannose; the ketohexoses like fructose and sorbose; disaccharides like lactose and maltose; and non-reducing disaccharides such as sucrose. The sugars should be of a low molecular weight so as to offer a substantial effect in increasing the osmotic pressure of the sugar solution. Conventionally the sugar content will be at least about 10% by weight of the final expanded product.

In addition to the sugar, other water soluble materials are satisfactory and desirable to provide the bacteriostatic effect. Illustrative of suitable compounds are sorbitol, propylene glycol, glycerine and sodium chloride.

A necessary material to be employed as a source component is fresh meat. The term "fresh meat" as used herein, refers to conventional sources of meat as applied to the flesh of cattle, swine, sheep and goats, and also horses, whale and other mammals, poultry, fish, etc. The term "fresh" is used in the context that the meat is not dried or rendered, and would exclude derived products such as meat meal or bone meal. Thus, fresh meat is defined to connote meat with fat inclusions as derived directly from an animal fleshy portion without changing the nature thereof.

It is required that for necessary product characteristics, the final concentration by weight of the fresh meat, should be at least about 10%. With a lower concentration of this ingredient, the product would not have the necessary properties of its unique texture and bubbly surface appearance combined with its shelf-stability. The maximum concentration of fresh meat in the final product should be a maximum of about 40% by weight. An optimum concentration is about 30% such as 27 to 33%.

Another critical source ingredient is a farinaceous component which aids in expansion in the processing steps and aids in imparting the desirable bubbly surface appearance to the final product. The source of the farinaceous ingredient may be any of the more common grains such as corn, wheat, barley, and their derivatives, such as corn meal, wheat flour, etc. However, non-grain sources of the farinaceous component such as tapioca are most desirable.

The farinaceous component which is added to the proteinaceous fresh meat material plays an imporant factor in determining the degree of expansion in the final product. Also, the farinaceous ingredient plays a critical role in the determination of surface appearance. In addition to adding a bubbly quality, gelatinization of a farinaceous ingredient during processing causes portions of the total product to resemble fat due to inclusion of this starch ingredient. As a practical result, if desired, the fat present may be decreased without sacrificing the desirable appearance of a lean meat that contains some fat. Excessive fatty foods in a diet are held by many medical authorities to be detrimental to the health of the consumer. It is possible to partially substitute the farinaceous ingredients for fat without sacrificing the appearance of a meat containing product.

It may be summarized that the farinaceous component serves several roles in the makeup of the final product. The starch is gelatinized and when subjected to elevated temperature and pressure followed by a sudden pressure release, expands greatly. As an additive material the farinaceous component causes the overall product to have lesser density. Additionally, the farinaceous component adds desirable qualities to the visual appearance of the meat containing product due in part to the unique and novel bubbly surface appearance. The concentration of the farinaceous component will ordinarily be employed in a minimum content of about 3% with a maximum concentration of 25% by weight of the final product. Optimum farinaceous levels are in the range of about 7 to 15%.

The pH range of the source ingredients, and particularly of the final packaged product any be any value that is acceptable to the consumer. It will be readily realized that a suitable pH can be realized over a broad range. For example, in the case of cats, a pH range of 4.5 to 5.0 appears to give the highest degree of palatability. However, in the case of dogs, a pH substantially above 5.0 such as 6.0 to 8.0 is more desirable. Therefore, the pH of the final expanded product is determined only by what is acceptable from a consumption viewpoint.

In the technique of forming expansion, it is required that ingredients be subjected to elevated temperature and elevated pressure prior to a sudden release and decrease of these conditions. Also, mechanical working prior to extrusion has been found to be desirable. While it is preferable that the proteinaceous material be subjected to heat and the farinaceous ingredient be at least partially gelatinized prior to the elevated temperatture and pressure conditions, it is permissible to obtain the necessary heating and gelatinizing in one operation during the elevated temperature and pressure working condition. One technique to aid in cooking and gelatinization would be to inject high pressure steam into the ingredients prior to extrusion.

Prior to subjection to elevated temperature and pressure, water and water soluble solids are added. While these water soluble solids would be predominantly sugar, as defined herein, other low molecular weight compounds may be incorporated, such as sorbitol, propylene glycol, glycerine, and sodium chloride. These compounds act in conjunction with one another and endow the food with microbiological protection due to the osmotic pressure effect of these water soluble solids.

To balance the food nutritionally, it may be desirable to add additional ingredients prior to expansion-extrusion. Illustrative of such ingredients are vegetable materials that are high in protein content. Such concentrated vegetable protein sources as derived from oilseed materials are commercially available as concentrates, isolates and flours. Another example of a nutritional supplement is a milk protein such as contained in skim milk.

The pressures to which the source materials are subjected are determined by the needed pressure drop across the orifice upon extrusion. Pressure differentials upward from about 100 p.s.i. are satisfactory in providing a requisite pressure drop and conventionally the composition is extruded into the atmosphere. Normally pressures below 1000 p.s.i. would be employed, but higher pressures are not precluded. The sudden pressure release with a necessary extrusion is a critical factor in obtaining the necessary expansion and low density of the product. Additionally, the back pressure in the apparatus and the pressure drop across the orifice may be controlled by the number of openings utilized in extrusion, as well as the size and shape of these orifice openings. The back pressure will also be influenced (controlled) by the feed rate, moisture level of the feed, and the character of the dough or mix. While the pressure obtained in the system conventionally is obtained with extensive mechanical working as from a screw-type extruder, it is possible to obtain the pressure increase by other apparatus as long as mechanical working takes place prior to extrusion-expansion.

The temperatures that are employed in the process of working the source ingredients prior to extrusion-expansion range upwards from about 212° F. The upper temperature limit is dictated by the amount of degradation that source components such as the vegetable protein can withstand. Also, excessive temperatures for prolonged time periods can cause browning of the sugar constituent which is generally undesirable.

The degree of expansion in the product after extrusion is influenced by the processing conditions, as well as by the source ingredients. The exact conditions that will be employed during processing will be influenced by the amount of expansion desired, as well as the influence of the source ingredients upon the expansion. The amount of mechanical working, the temperature and pressure drop across the orifice will influence the expansion effect. Insofar as ingredients are concerned, the amount of farinaceous component and amount of water will influence the expansion effect.

As previously mentioned, the source ingredients are critical in obtaining the necessary expansion effect in the extrusion technique. An intermediate moisture system such as that disclosed in Burgess et al. Pats. 3,202,514 and 3,482,985, discussed above, will not produce the expansion in products of the present invention. Additionally, the unique bubbly surface appearance will not be duplicated. Meat containing products made in accordance with the technique of the Burgess et al. patents will not expand to a sufficient degree by extrusion-expansion techniques per se. It is known that sugars in a food mix and the presence of fat (above 5%) tend to retard and hamper expansion. Thus, for example, in a fresh meat containing product, the fat level from the meat interferes with the desired expansion effect and these types of products are dense in comparison with products of the present disclosure.

The intermediate moisture food because of its ability to withstand bacterial spoilage, may be packaged without commercial sterilization which aids in precluding spoilage. However, the food may serve as a host for mold and yeast development, therefore, the food preferably has an antimycotic agent incorporated at a sufficient level to prevent the growth of such organisms. Illustrative of suitable antimycotic agents are sorbate salts such as potassium sorbate and calcium sorbate, as well as sorbic acid. Other examples include benzoic acid, sodium benzoate, propionic acid, sodium and calcium propionate, propylene glycol, diethylpyrocarbonate and mendione sodium bisulfate (vitamin k). A material such as propylene glycol has the quality of imparting both bacteriological stability as well as antimycotic properties.

The technique of incorporating the antimycotic is not critical and may be incorporated with the ingredients prior to being processed to form the expanded composition. Some antimycotics may be applied as by spraying to the food surface immediately prior to wrapping or merely applied as a coating to the wrapping material. In place of employing an antimycotic, other techniques preventing mold growth are possible such as use of irradiation from gamma and/or beta radiation. To further illustrate the innovative technique and formulation of this invention, the following examples are provided.

EXAMPLE I

The following ingredients were employed to produce 100 lbs. of a final product at 22.5% moisture:

| | Pounds |
|---|---|
| Tripe | 22.0 |
| Beef cheek trimmings | 9.0 |
| Sucrose | 20.0 |
| Dicalcium phosphate USP | 2.5 |
| Soya hulls | 1.0 |
| Dry skimmed milk | 2.0 |
| Propylene glycol | 2.0 |
| Emulsifier | 1.0 |
| Iodized salt | 1.0 |
| Potassium sorbate | 0.35 |
| Bleachable fancy tallow | 1.5 |
| Tapioca Starch—Type S.R. | 7.5 |
| Vital wheat gluten | 4.0 |
| Pregel corn flour | 4.0 |
| Dye: | |
| Red #2 | 0.0065 |
| Iron oxide | 0.0325 |
| Water (for processing) | 6.0 |
| Soya flour | 23.5 |
| Vitamins | 0.13 |

The meats and liquids of the above composition were placed in a jacketed sigma bladed mixer and heated to boiling. The remaining dry ingredients were added and the total sum of the ingredients was heated with mixing to 160° F. which took about 8 minutes. This cooked dough-like material is ground in a meat grinder type extruder to make the mix workable and homogenous.

The dough is fed into the inlet of a Wenger X–25 Extruder at a rate that would be about 300 lbs. per hour. Thirty p.s.i.g. steam is employed on all jackets of the Wenger Extruder. The dough composition is extruded through one 9/32" diameter hole and expands into a rope 3–4 times the diameter of the die hole. The extrudate is cut into pieces about ½" in length by an outside cut off knife. These cut pieces were allowed to drop into a continuous cooling screen which cooled the particles rapidly to room temperature. The soft moist chunks were packaged in a moisture impermeable pouch of cellophane.

EXAMPLE II

The following ingredients were employed to produce 100 pounds of a final product at 30% moisture:

| | Pounds |
|---|---|
| Tripe | 22.0 |
| Beef cheek trimmings | 7.0 |
| Dextrose | 10.0 |
| Corn syrup | 1.5 |
| Propylene glycol | 2.0 |
| Bleachable fancy tallow | 1.5 |
| Soya flour | 20.0 |
| Emulsifier | 1.0 |
| Soya hulls | 0.9 |
| Salt | 0.9 |
| Potassium sorbate | 0.3 |
| Corn flour | 18.7 |
| Dye | 0.085 |
| Dicalcium phosphate USP | 2.0 |
| Vitamin mix | 0.13 |
| Water | 12.0 |

The processing procedure is the same as that for Example I.

What we claimed is:

1. A method for producing an expanded meat food product having a bubbly surface appearance comprising mixing fresh meat, a farinaceous component, water and water soluble solutes comprising sugar; subjecting the mixture to an elevated temperature to at least partially gelatinize said farinaceous component; passing the mixture including said at least partially gelatinized farinaceous component through an extruding zone while subjecting the mixture to an elevated temperature ranging upwards from about 212° F. and an elevated pressure ranging upwards from about 100 p.s.i. with mechanical working; suddenly releasing the pressure by passing the mixture through an extruder die orifice to cause a degree of expansion of the product to about 3–4 times the diameter of the extruder die orifice and wrapping said expanded product in a moisture impermeable container; said expanded product containing at least 10% by weight fresh meat, fat in a concentration above 5% by weight, water in an amount between 15 to 35% by weight, farinaceous component between about 3 to 25% by weight, and water soluble solutes in an amount of at least 10% by weight, sufficient to impart a bacteriostatic effect.

2. The process of claim 1 wherein a vegetable protein source is included in the mixture prior to extrusion.

3. The process of claim 1 wherein an antimycotic is added to the initial mixture.

4. The process of claim 1 wherein said water soluble solutes comprise a mixture of sugar present in an amount of at least 10% by weight of the expanded product and a member selected from the group consisting of sorbitol, propylene glycol, glycerine, sodium chloride, and mixtures thereof.

5. The product produced by the process of claim 1.

(References on following page)

References Cited

UNITED STATES PATENTS

| | | | |
|---|---|---|---|
| 3,119,691 | 1/1964 | Ludington et al. | 99—2 |
| 3,202,514 | 8/1965 | Burgess et al. | 99—2 |
| 3,447,929 | 6/1969 | Hale | 99—7 |
| 3,482,985 | 12/1969 | Burgess et al. | 99—2 |
| 3,615,652 | 10/1971 | Burgess et al. | 99—7 |
| 3,139,342 | 6/1964 | Linskey | 99—2 |
| 3,653,908 | 4/1972 | Buck et al. | 99—2 |

HYMAN LORD, Primary Examiner

U.S. Cl. X.R.

99—2